June 26, 1951 — R. L. BURDEN — 2,558,124
TACKLE BOX
Filed June 24, 1949 — 2 Sheets-Sheet 1
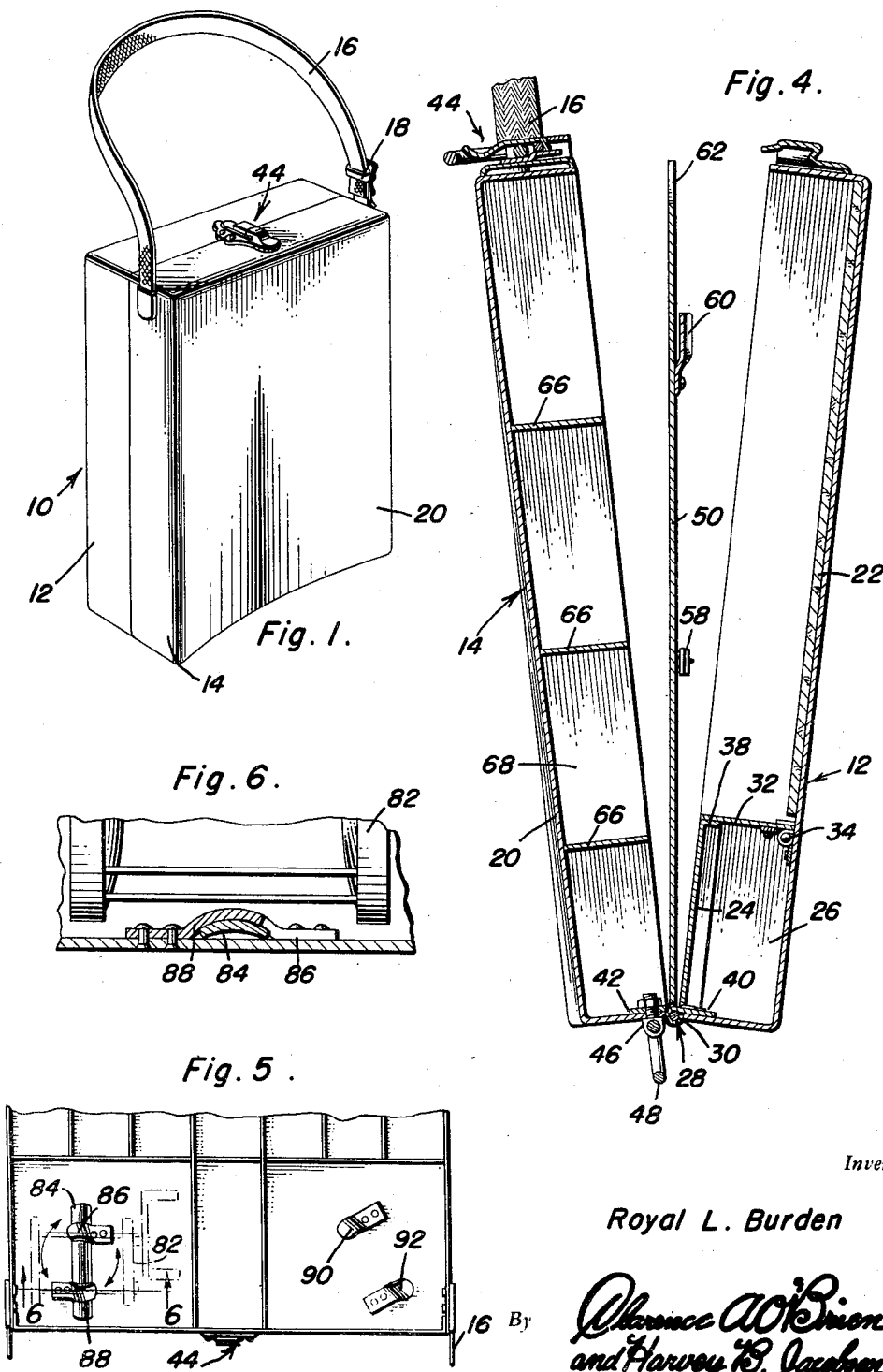
Inventor
Royal L. Burden

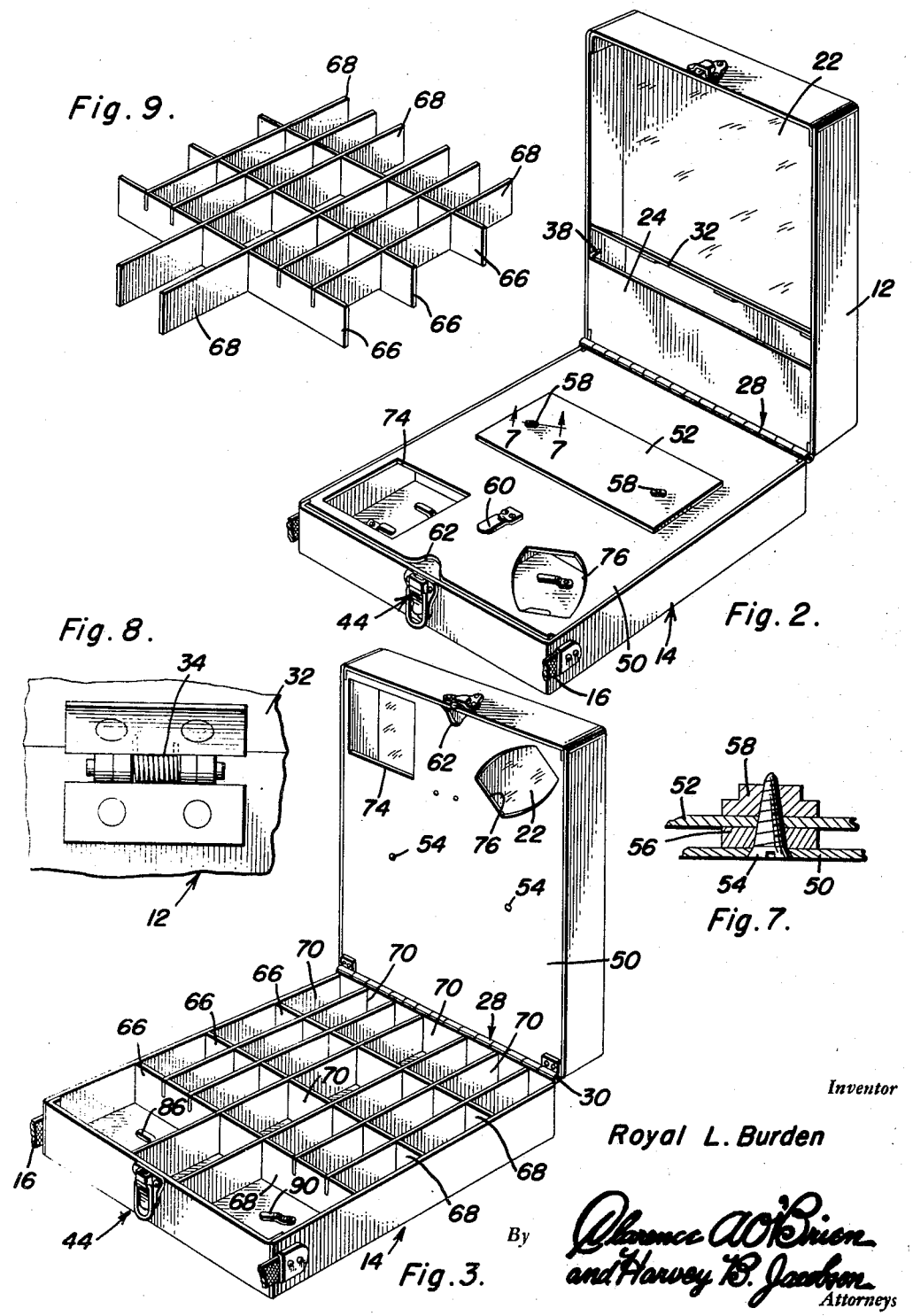

Patented June 26, 1951

2,558,124

UNITED STATES PATENT OFFICE 2,558,124

TACKLE BOX

Royal L. Burden, Piqua, Ohio, assignor of fifteen per cent to Tira Q. Dix, Dayton, Ohio, and fifteen per cent to Russell L. Dix, Springfield, Ohio Application June 24, 1949, Serial No. 101,173

1 Claim. (Cl. 43—54.5)

This invention relates to novel and useful improvements in tackle boxes.

An object of this invention is to support substantially all of the equipment aside from the rod which will be used in connection with fishing operations in an orderly fashion and in such condition and by such means that the various items will not become disarranged and mixed together even upon what might be considered unreasonable jarring and shaking.

Another object of this invention is to so support the majority of the appurtenances contiguous to fishing operations by means of a single container which is very easily supported by a shoulder strap, so that the fisherman's hands are free to hold other articles such as a lunch pail, beverage container, rod and others.

Another purpose of this invention is to provide an improved article of manufacture which will render transportation of fishing equipment easy and which may well be used for storage of all of the articles in a single place so that they may be found very readily from one season to the next.

Ancillary objects and features of novelty will become apparent to those skilled in the art, in following the description of the preferred form of the invention, illustrated in the accompanying drawings, wherein:

Figure 1 is a perspective view of the device showing it in the closed position;

Figure 2 is a perspective view of the device showing one of the sections in the open position;

Figure 3 is a perspective view somewhat similar to that shown in Figure 2; however, the partition dividing the sections having been moved to the up position;

Figure 4 is a central longitudinal sectional view of the device shown in Figures 1, 2 and 3.

Figure 5 is a fragmentary plan view of a portion of one of the sections showing particularly the attachment of a reel in a reel compartment;

Figure 6 is a sectional view taken on the line 6—6 of Figure 5 and in the direction of the arrows;

Figure 7 is a sectional detail of construction taken on the line 7—7 of Figure 2 and in the direction of the arrows;

Figure 8 is a fragmentary view showing the hinge structure for one of the closures used in connection with the device; and Figure 9 is a perspective view of the plurality of plates which are nested in such position as to form side walls for various compartments.

The transportation of articles used in connection with fishing operations sometimes poses a problem in that a fisherman generally desires to carry a great number of articles with him during a fishing trip, whether it be for a few hours or a few days. Accordingly, it is within the purview of the present invention to provide a structure for carrying and storing the various articles used in connection with fishing operations so that a great selection of articles will be at hand during fishing operations. It is also intended that the articles be maintained separate and distinct from each other through the utility of the device.

A housing generally indicated at 10 is provided of two sections 12 and 14, respectively. Section 14 is the "back" section, it having a strap 16 fixed thereto and having a device 18 for effectively lengthening and shortening the belt. The back 20 of the section 14 is smoothly curved so that it will fit or suit the contour of the user's body when the device is properly placed on an individual, that is, with the strap around the shoulder.

Taking, first, the internal structure of the section 12, it is seen that a part of the back thereof has a liner 22 of comparatively soft penetrable material such as cork. This liner is adapted to support hooks, flies and other sharp objects which are simply inserted properly in spaced relation with respect to each other. Using parts of the side walls of the section 12 and a cover plate 24 which is fixed to the said parts of the side walls, a compartment 26 is formed in the section 12 adjacent the hinge 28 which includes the hinge pin 30. This hinge is preferably of the piano type. A door 32 is fixed in front of the compartment 26 by means of spring-loaded hinges 34 (Figure 8) which are, in themselves, conventional. The function of the spring-loaded hinges is to constantly press the closure 32 against the abutment 38 formed at the edge of the plate 24, thereby constantly closing the compartment until such time that the door 32 is manually opened.

The hinge 28 is fixed by means of its leaves 40 and 42, respectively, to the upstanding ends of the sections 12 and 14, thereby hingedly connecting the sections. In order to retain the sections in the closed position, the cam-operated type trunk latch 44 which is secured to the ends of the section opposite those ends having the hinge thereon is used. Passed through one of the hinge leaves 42 is a socket member 46 which has a ring 48 carried thereby. This ring is used for the purpose of hanging the device or fixing a strap thereto for various purposes.

A partition 50 which is of flat plate type stock is secured to the hinge pin 30 for hinged movement with respect to both of the sections 12 and 14. This partition serves a dual function. The first function is to close either of the open sections when the device is open, and the second function is to support various fishing apparatus, such as the card 52 having fishing leaders thereon.

The means for fastening the card to the partition 50 consists of a pair of screw-type assemblies. Each screw-type assembly includes a screw 54 which is passed through the partition 50 but has its head countersunk therein. A threaded member such as a nut 56 is fixed to the partition 50 and a removable nut 58 is disposed on the screw clamping the card 52 therebetween (Figure 7). The removable nut 58 in each assembly faces the section 12 so that the articles supported on the partition 50 will be directed toward and even partially within the section 12.

A finger 60 is fixed to the same surface of the partition 50 which has the card supporting means thereon. This finger is adapted to be disposed in the sleeve of a reel seat thereby retaining it in place on the same surface of the partition 50 as the card 52.

A suitable finger-receiving recess 62 is formed in one edge of the partition so that it may be conveniently hingedly operated about the hinge pin 30 as an axis. The side opposite the one having the card and other appurtenant supporting means of the partition faces the open side of the section 14. This section has a number of open compartments formed therein. These open compartments are fabricated by using the bottom of the section 14 and by using a nest of intersecting plates, one group of plates 66 being substantially parallel to each other and a group of intersecting plates 68 which are also parallel to each other. The plates are held in place by means of forming suitable slots in the plates as disclosed in Figure 9, and disposing the mutually slotted parts of the plates in such position that they are matching. Hence, the partition 50 forms a closure for the open compartments 70 which are formed as disclosed above.

Two of the open compartments are relatively larger than the remainder. It is a matter of choice as to how large the compartments should be. However, it is suggested that the compartments be made of such size as to accommodate large leaders, fishing plugs and the like.

The two largest compartments are adapted to support fishing reels. In general, there are two types of reels, insofar as shape is concerned, which are used widely today. Accordingly, two different shaped openings 74 and 76, respectively, are formed in the partition 50 so that the two relatively large compartments in the section 14 will remain open when the other compartments are closed by the partition 50. The one opening 74 is rectangular in shape, while the other opening 76 has two sides which are arcuate. It is proposed to place a fly fishing type reel in the compartment immediately below the non-rectangular opening 76 and to place the slightly more widely used type of reel in the compartment immediately below the opening 74. The use of the non-square opening 76 is so that a reel may be removed and insetted by placing the fingers alongside of the substantially circular end thereof and rotating it.

The means for fastening the reels in place are substantially identical, except possibly for a change in size. In Figure 6, the reel 82 is shown as having the usual reel seat engaging member 84 fixed thereto. This reel seat engaging member is adapted to be disposed between two small brackets 86 and 88 which are fixed in the bottom of the compartment under discussion. The ends of the bracket are twisted slightly so that by placing the reel 82 in this compartment and rotating it slightly, the reel seat engaging member 84 is pressed under the brackets 86 and 88 and frictionally retained in place.

In the other reel compartment, the brackets 90 and 92, respectively, are utilized for the identical purpose as the brackets 86 and 88.

Having described the invention, what is claimed as new is:

A tackle box comprising a housing composed of a pair of sections, a hinge secured to adjacent edges of said sections to hingedly connect the sections, a partition dividing said sections and mounted on said hinge, a liner of penetrable material disposed in a part of one of the sections to support fish hooks and flies, a closed compartment disposed adjacent said liner, open compartments to support plugs in the other section closed by said partition, and means comprising a pair of brackets disposed in at least one of said open compartments for holding a reel, and said partition having an opening therein so arranged that the reel compartment is open when the other open compartments are closed by said partition.

ROYAL L. BURDEN.

REFERENCES CITED

The following references are of record in the file of this patent:

UNITED STATES PATENTS

| Number | Name | Date |
| --- | --- | --- |
| 891,103 | Schaney | June 16, 1908 |
| 1,314,915 | Trullench | Sept. 9, 1919 |
| 1,736,337 | Borel | Nov. 19, 1929 |
| 2,415,767 | Shaw | Feb. 11, 1947 |